United States Patent
Christoph et al.

(10) Patent No.: US 9,282,600 B2
(45) Date of Patent: Mar. 8, 2016

(54) TRANSFORMERLESS RESONANT BOOST SUPPLY CIRCUIT

(75) Inventors: Martin Paul Christoph, Aachen (DE); Joseph Hendrik Anna Maria Jacobs, Eygelshoven (NL); Dirk Hente, Wuerselen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 17 days.

(21) Appl. No.: 13/258,643

(22) PCT Filed: Mar. 15, 2010

(86) PCT No.: PCT/IB2010/051109
§ 371 (c)(1),
(2), (4) Date: Sep. 22, 2011

(87) PCT Pub. No.: WO2010/109371
PCT Pub. Date: Sep. 30, 2010

(65) Prior Publication Data
US 2012/0014153 A1    Jan. 19, 2012

(30) Foreign Application Priority Data
Mar. 23, 2009    (EP) .................................... 09155842

(51) Int. Cl.
*H02M 3/07* (2006.01)
*H02M 3/158* (2006.01)
*H05B 33/08* (2006.01)
*H02M 1/00* (2007.01)

(52) U.S. Cl.
CPC ............. *H05B 33/0815* (2013.01); *H02M 3/07* (2013.01); *H02M 3/158* (2013.01); *H02M 2001/0058* (2013.01); *Y02B 20/346* (2013.01); *Y02B 20/348* (2013.01); *Y02B 70/1425* (2013.01)

(58) Field of Classification Search
CPC   H02M 2001/0058; H02M 3/07; H02M 3/158
USPC ............. 363/15–17, 20, 21.01–21.03, 22–26, 363/59–60, 123–124, 131–133; 323/222, 323/265, 268, 271; 315/127, 186
See application file for complete search history.

(56) References Cited

U.S. PATENT DOCUMENTS

| | | | | |
|---|---|---|---|---|
| 4,713,220 A * | 12/1987 | Huynh et al. | ................. | 363/136 |
| 4,860,184 A * | 8/1989 | Tabisz et al. | ................. | 363/132 |
| 5,303,140 A * | 4/1994 | Shimizu | ........................ | 363/132 |
| 6,118,225 A * | 9/2000 | Wessels | ........................ | 315/247 |
| 7,110,269 B2 * | 9/2006 | Cao et al. | ................... | 363/21.03 |
| 2002/0047693 A1 * | 4/2002 | Chang | .......................... | 323/222 |
| 2004/0183513 A1 * | 9/2004 | Vinciarelli | ..................... | 323/284 |

FOREIGN PATENT DOCUMENTS

| JP | 02202365 A |   | 8/1990 |
|----|------------|---|--------|
| JP | 1992-141992 A | * | 5/1992 |
| JP | 1995-255169 A | * | 10/1995 |

(Continued)

*Primary Examiner* — Fred E Finch, III
*Assistant Examiner* — Jye-June Lee
(74) *Attorney, Agent, or Firm* — Yuliya Mathis (57) ABSTRACT

A power supply circuit for providing an output voltage that is higher than an input voltage. The power supply circuit is comprised of a bridge circuit and a resonant circuit, and is coupleable to a power source and a load circuit. The power supply circuit provides a boost function for stepping up an input voltage in order to reduce the required number of battery cells in order to power a load, such as a series of LEDs.

15 Claims, 9 Drawing Sheets

(56) References Cited

FOREIGN PATENT DOCUMENTS

| | | | |
|---|---|---|---|
| JP | 07255169 A | * | 10/1995 |
| WO | 2007102106 | A2 | 9/2007 |
| WO | 2008029330 | A2 | 3/2008 |
| WO | 2008110978 | A1 | 9/2008 |
| WO | 2008152565 | A2 | 12/2008 |

* cited by examiner

TRANSFORMERLESS RESONANT BOOST SUPPLY CIRCUIT

FIELD OF THE INVENTION

The present invention relates to a supply circuit, and also relates to a device comprising a supply circuit.

BACKGROUND OF THE INVENTION

Supply circuits, in particular switched mode power supplies are well known in the art. Such supply circuits are for example integrated in consumer and non-consumer products. An exemplary application is the powering of light-emitting diodes (LEDs) and/or organic light-emitting diodes (OLEDs), in particular LED/OLED strings used for automotive LED/OLED lighting and in general, battery powered LED/OLED lighting systems.

Supply circuits that are best suited and therefore are preferably used for the above-named applications are in particular Discontinuous Series Resonant Converters with a constant average current output I, in the following denoted as DSRC-I. This type of converter is for example described in WO2008/110978. The functionality of this type of converter is well understood by those skilled in the art and is therefore not explained in more detail. DSRC-I converters provide the advantage of a constant average current output, furthermore, no current sensing and no current control loop is required. Consequently, losses caused by a current sensing are avoided, and the DSRC-I provides a high-efficient, compact and easy design compared to other commonly known series resonant converters.

A disadvantage of the basic DSRC-I converter is that the output voltage has to be lower than the input voltage if no transformer or additional components such as an additional voltage doubler circuit are provided. However, both solutions need space and increase the costs of the circuitry. As an example, an LED backlight of a car, which consists of several LEDs in a series connection will need more than 12 V of the car battery, e.g., 5 LEDs in series require 5×3.3 V=16.5 V. Hence, the DSRC-I causes problems if several LEDs have to be connected in series and only a low supply voltage is available, e.g., in automotive applications.

Battery powered systems often also stack cells in series to achieve a higher output voltage. However, sufficient stacking of cells is not possible in many high voltage applications due to a lack of space.

SUMMARY OF THE INVENTION

It is an object of the present invention to provide a supply circuit by which an output voltage can be obtained that is higher than the input voltage. The supply circuit comprising a boost function according to the present invention can step up the input voltage, i.e., increase the output voltage and so reduce the number of battery cells.

According to an aspect of the present invention a supply circuit is provided comprising a bridge circuit comprising at least two series-connected switches being coupleable to a load circuit, a resonant circuit coupleable at one end to a power source and coupled at another end to the interconnection of the at least two switches of the bridge circuit, and at least two diodes, wherein a diode is coupled between each switch and the power source.

This converter topology provides a constant average current output at a higher output voltage than the input voltage.

Further, it has a simple circuit design and does not require a transformer or another additional component. Altogether, the converter provides the advantage that no current sensing and current control is required, furthermore, a very compact circuit design is provided with an integrated voltage boost. The supply circuit according to the present invention is above all easy to design, simple to control and provides a high efficiency. The detailed functionality of the supply circuit will be explained in the context of the Figures.

In a first aspect of the present invention a supply circuit is presented, wherein one diode is polarized with respect to the assigned switch so that a flow of negative (polarized) resonant current is allowed and another diode is polarized with respect to the assigned switch so that a flow of positive (polarized) resonant current is allowed. This provides the advantage that only a positive current flows through the output.

In a further aspect of the present invention a supply circuit is presented, wherein the resonant circuit is a series resonant circuit comprising an inductance and a capacitance. This is advantageous as it assures the advantageous functionality of the DSRC-I as well as zero current switching (ZCS), which is well known in the art and is therefore not further explained.

In yet another aspect of the present invention a supply circuit is presented, wherein the resonant circuit is coupled to the interconnections between the diodes and the power source. In particular, the capacitance is divided into at least two partial capacitances, each partial capacitance comprising half the resonant capacitance, each partial capacitance being coupled to the interconnections of the diodes and the power source. This topology is advantageous as a boost function is realized and in addition, the major advantageous of the common DSRC-I are upheld.

In a further aspect of the present invention a supply circuit is presented, wherein the at least two switches of the resonant circuit are MOSFETs. This is advantageous because the MOSFETs are suitable for the above-named applications and are in addition easy to control.

In a further aspect of the present invention a supply circuit is presented, further comprising a control unit, which is adapted for providing a maximum switching frequency of the bridge circuit, which is in the range from 10% to 50% of the resonant frequency of the resonant circuit, in particular in the range of half the resonant frequency of the resonant circuit.

Furthermore, the control unit is adapted for providing a switching of the switches of the bridge circuit with a duty-cycle of up to 50%. Practically, a duty-cycle of exactly 50% cannot be achieved, but a short dead-time has preferably to be implemented between the high-side and the low-side switch, which is preferably in the range from 100 ns to 1 μs.

According to another aspect of the present invention a device is provided comprising a power supply, a load circuit, and a supply circuit as proposed according to the present invention for supplying said load circuit. It shall be understood that the device comprises the same advantages as the supply circuit itself. The device may comprise one or more loads, whereas the load comprises one or more LEDs, OLEDs or the like, and the device could, for instance, be a lighting unit.

Preferably, said output filter is arranged between said supply circuit and said load circuit. The output filter stabilizes the output voltage and, hence, guarantees a lower DC ripple of the load current. The output filter can be implemented simply by a capacitor coupled in parallel to the load circuit, but more complicated filters are possible, e.g. comprising series and/or parallel circuits comprising one or more capacitors and/or inductances, as are generally known in the art.

It shall be understood that the claimed device has similar and/or identical preferred embodiments as the claimed supply circuit as defined in the dependent claims.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
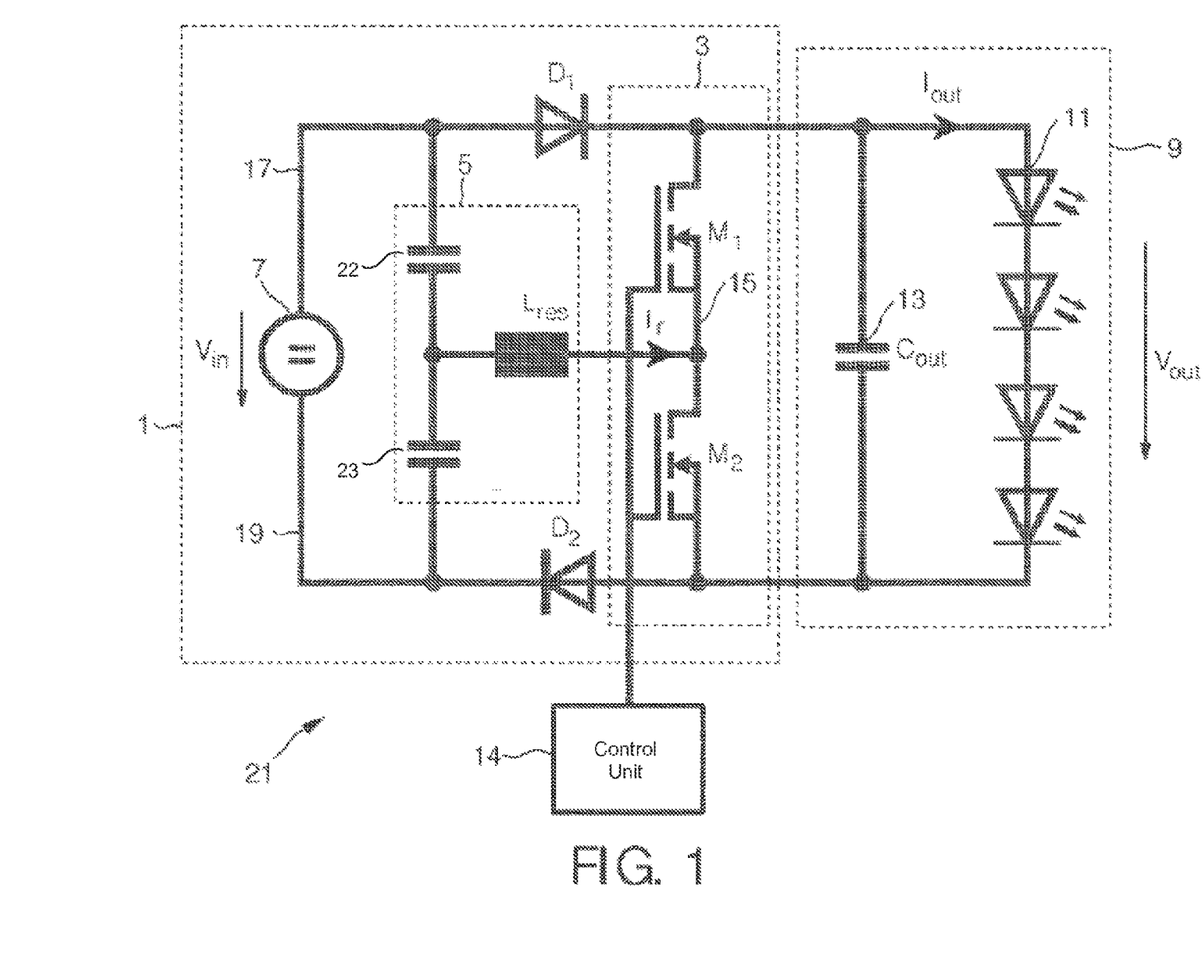
FIG. 1 shows a block diagram of a supply circuit in accordance with an embodiment of the present invention.

FIG. 1 shows a block diagram of a supply circuit 1 in accordance with an embodiment of the present invention. The supply circuit 1 comprises a bridge circuit 3, a resonant circuit 5, which is coupleable at one end to a power source 7, wherein the power source 7 is preferably a direct voltage source. The supply circuit 1 is coupled to a load circuit 9, which comprises at least one, in FIG. 1 exemplary a total of four, loads 11 and a smoothing capacitor 13 being connected in parallel to the loads 11. A load 11 may be a LED, an OLED or the like. The output voltage $V_{out}$ is dropped across the array of loads 11.

The bridge circuit 3 comprises at least two switches $M_1$ and $M_2$ that are exemplary MOSFETs, which are controlled by a control unit 14. In response to a direct current from the power source 7, the bridge circuit 3 communicates a voltage signal to the resonant circuit 5 at a switching frequency $f_{switch}$, which in turn communicates an alternating current $I_r$ to the load circuit 9.

The switches $M_1$ and $M_2$ of the bridge circuit 3 are preferably switched by means of the control unit 14, which is adapted to provide a switching duty-cycle of 50%. Furthermore, the control unit 14 is adapted to provide a maximum switching frequency $f_{switch\_max}$ of the bridge circuit 3, which is preferably half the resonant frequency $f_{res}$ of the resonant circuit 5.

The switches $M_1$ and $M_2$ are connected in series, whereas the source contact of switch $M_1$ is coupled to the drain contact of switch $M_2$ by an interconnection 15.

The resonant circuit 5 is coupleable at one end to the power source 7 and coupled at another end to the interconnection 15 of the at least two switches $M_1$ and $M_2$ of the bridge circuit 3. The resonant circuit 5 comprises an inductance $L_{res}$ and a capacitance $C_{res}$, whereas the capacitance $C_{res}$ is exemplary divided into two partial resonant capacitances 22, 23. Hence, each of the partial capacitances 22, 23 comprises half the resonant capacitance $C_{res}$, i.e. $C_{res}/2$.

FIG. 1 further illustrates that a diode $D_1$ is assigned to the switch $M_1$ and a diode $D_2$ is assigned to the switch M2. In particular, the diodes $D_1$ and $D_2$ are interconnected between each switch $M_1$ and $M_2$ and the power source 7 and are in particular connected in series with the respective assigned switch $M_1$ or $M_2$ on the one hand and to the power source 7 on the other hand. One of the diodes, in particular diode $D_1$ is polarized with respect to the assigned switch $M_1$ so that a flow of negative (polarized) resonant current $I_r$ through diode $D_1$ is allowed and another diode, in particular $D_2$ is polarized with respect to the assigned switch $M_2$ so that a flow of positive (polarized) resonant current $I_r$ through diode $D_2$ is allowed.

As will be explained in more detail later on, the voltage drop $V_1$ across the resonant circuit 5 depends on the diodes and depends in particular on which diode is at present conductive. Hence, the voltage drop across the resonant circuit 5 may be summarized as follows: M1 on, D1 is conductive: −Vin/2; M1 connected to D2, D2 is conductive: Vin/2−Vout; M2 connected to D2, D2 is conductive: Vin/2; M2 on, D1 is conductive: −Vin/2+Vout.

The partial capacitances 22, 23 are connected in series with the inductance $L_{res}$ and further are coupled to the interconnections between a diode $D_1$ or $D_2$ and the power source 7. Thus, one partial capacitance 22, is coupled to the interconnection 17 between diode $D_1$ and the power source 7, and the other partial capacitance 23 is coupled to the interconnection 19 between diode $D_2$ and the power source 7.

The above described novel topology of the supply circuit 1 realizes a DSRC-I comprising most of its major advantages and in addition provides a boost function, so that the output voltage $V_{out}$ is higher than the input voltage $V_{in}$ without the need for any additional components such as a transformer.

It shall be noticed that a device 21 according to the present invention comprises that supply circuit 1 and may in addition comprise one or more load circuits 9.

Figure 2:
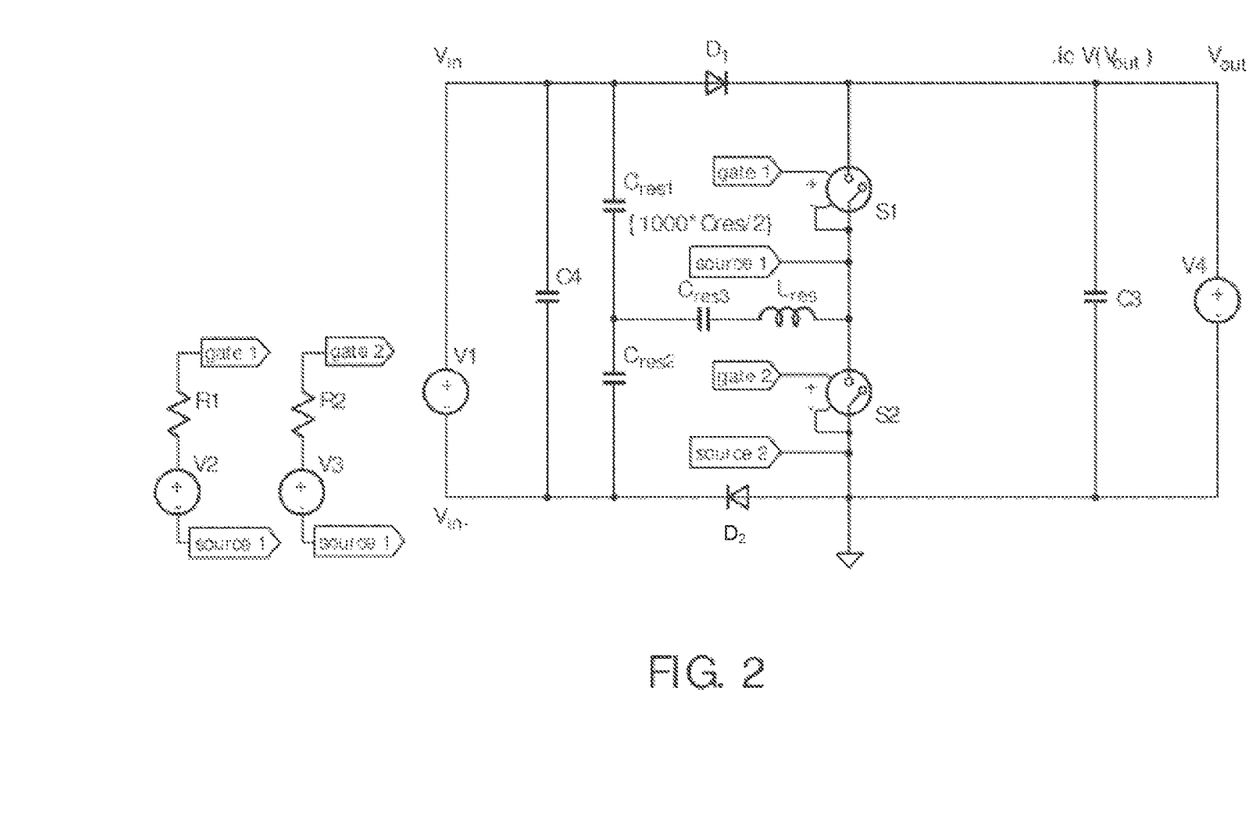
FIG. 2 shows a simulation schematic of the supply circuit in accordance with an embodiment of the present invention.

FIG. 2 shows a simulation schematic of the supply circuit 1 in accordance with an embodiment of the present invention, whereas FIG. 3 to FIG. 6 show simulation results for different sets of parameter values. The simulation schematic of FIG. 2 is based on the supply circuit topology illustrated in FIG. 1.

Figure 3:
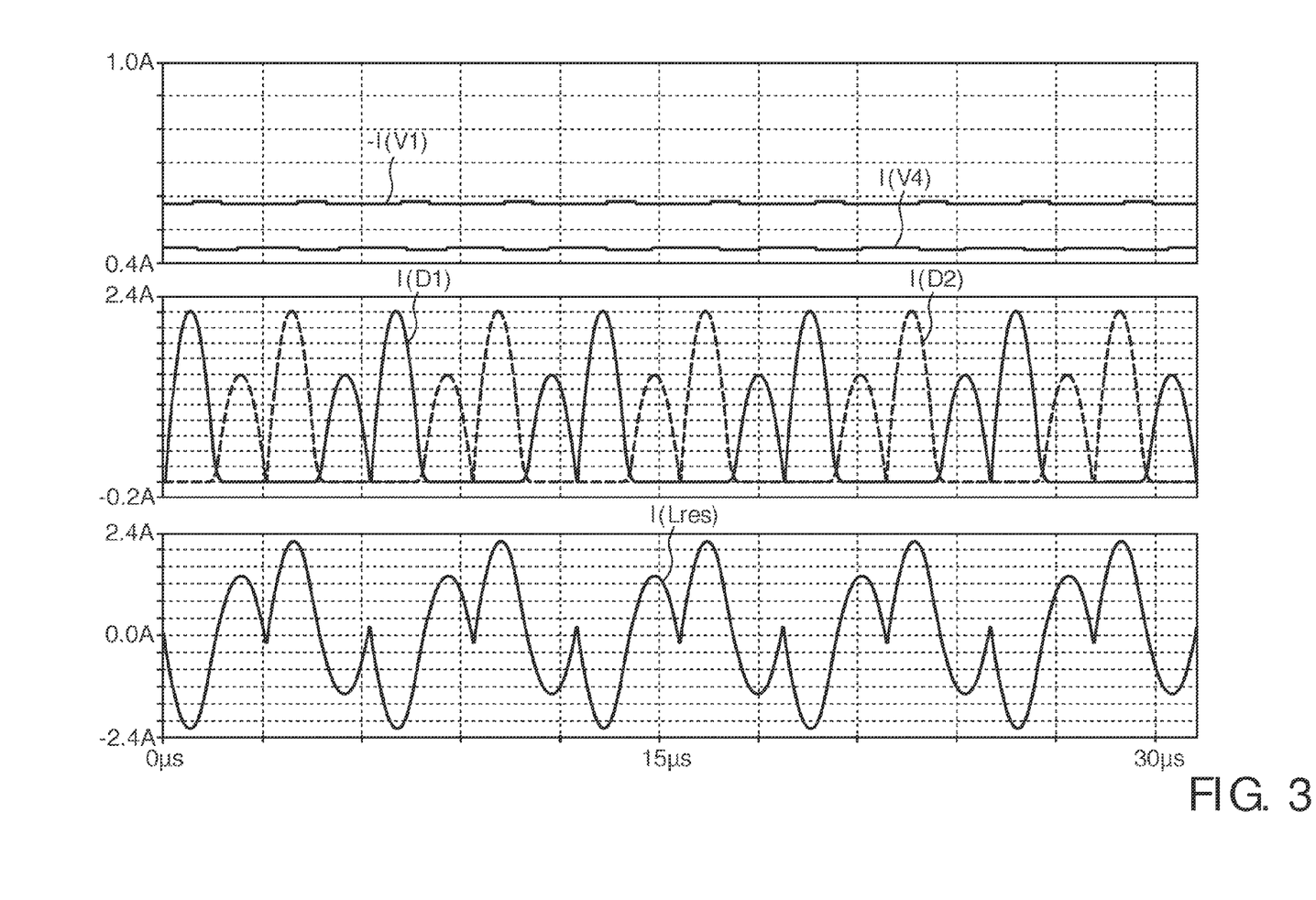
FIG. 3 shows simulation results for a first set of parameter values.

FIG. 3 shows simulation results for a second set of parameter values. In particular, the simulation results are based on an input voltage $V_{in}$=24 V, an output voltage of $V_{out}$=30 V and a switching frequency of the bridge circuit $f_{switch}=f_{res}/2$, i.e., the switching frequency is half the resonant frequency $f_{res}$.

The topmost simulation schematic of FIG. 3 illustrates the currents $I(V_1)$ and $I(V_4)$ as a function of time t. Thereby, the voltage $V_1$ corresponds to the voltage $V_{in}$ illustrated in FIG. 1 and the voltage $V_4$ corresponds to the voltage $V_{out}$ illustrated in FIG. 1. It is obvious that the output current $I(V_4)$ is lower than the input current $I(V_1)$.

The middle simulation schematic of FIG. 3 illustrates the diode currents $I(D_1)$ and $I(D_2)$ as a function of time t. As explained above, that diodes $D_1$ and $D_2$ are connected to their assigned switches $M_1$ and $M_2$ with opposite polarizations. Therefore, the diodes $D_1$ and $D_2$ allow current flow alternately depending on the polarization of the resonant current $I_r$ as will be explained in more detail hereinafter.

The lower simulation schematic of FIG. 3 illustrates the resonant current $I(L_{res})$ as a function of time t. The resonant current $I(L_{res})$ corresponds to the resonant current $I_r$ of FIG. 1.

Figure 4:
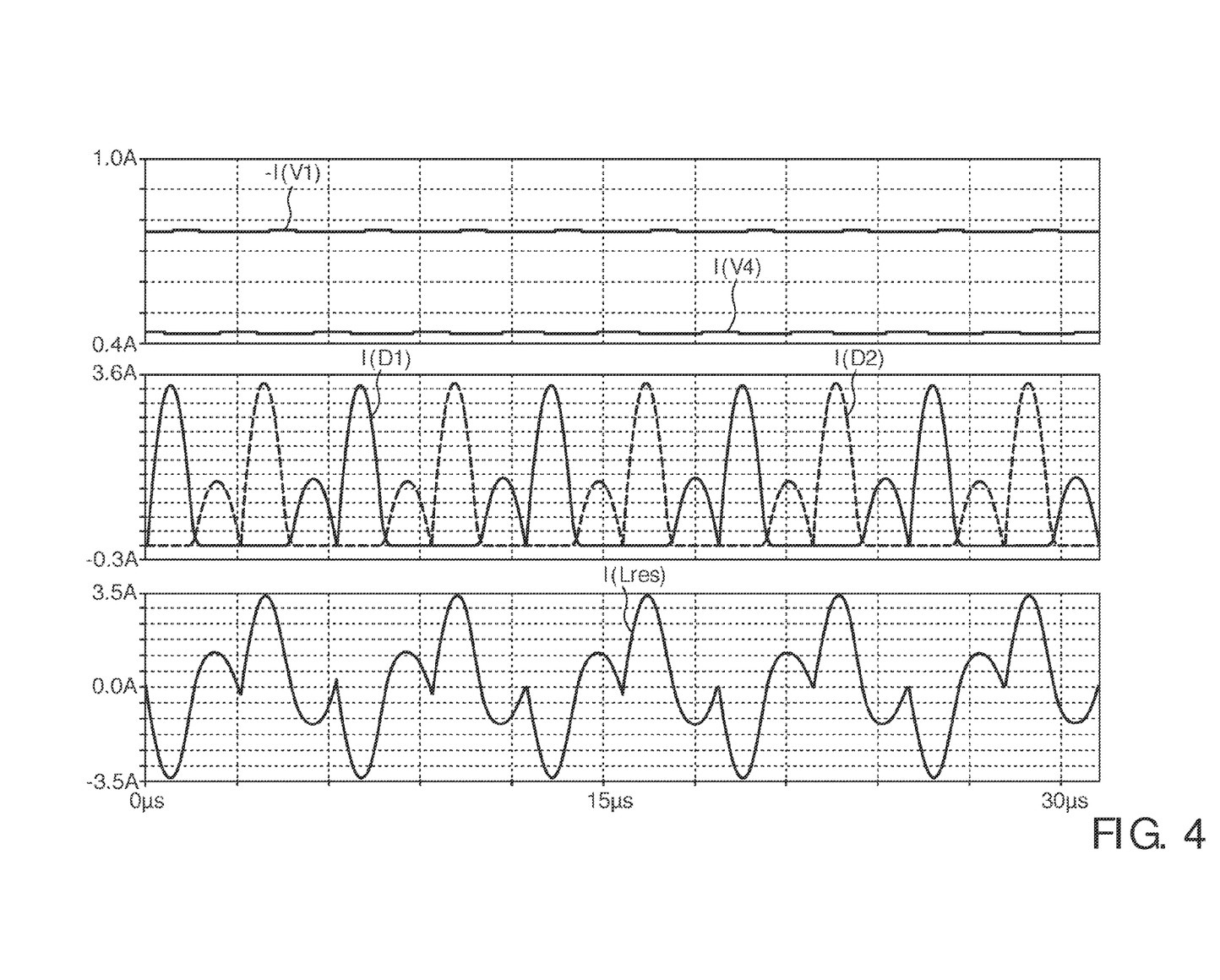
FIG. 4 shows simulation results for a second set of parameter values.

FIG. 4 shows simulation results for a second set of parameter values. In particular, the simulation results are based on an input voltage $V_{in}$=24 V, an output voltage of $V_{out}$=40 V and a switching frequency of the bridge circuit $f_{switch}$=$f_{res}$/2, i.e., the switching frequency is half the resonant frequency $f_{res}$.

Figure 5:
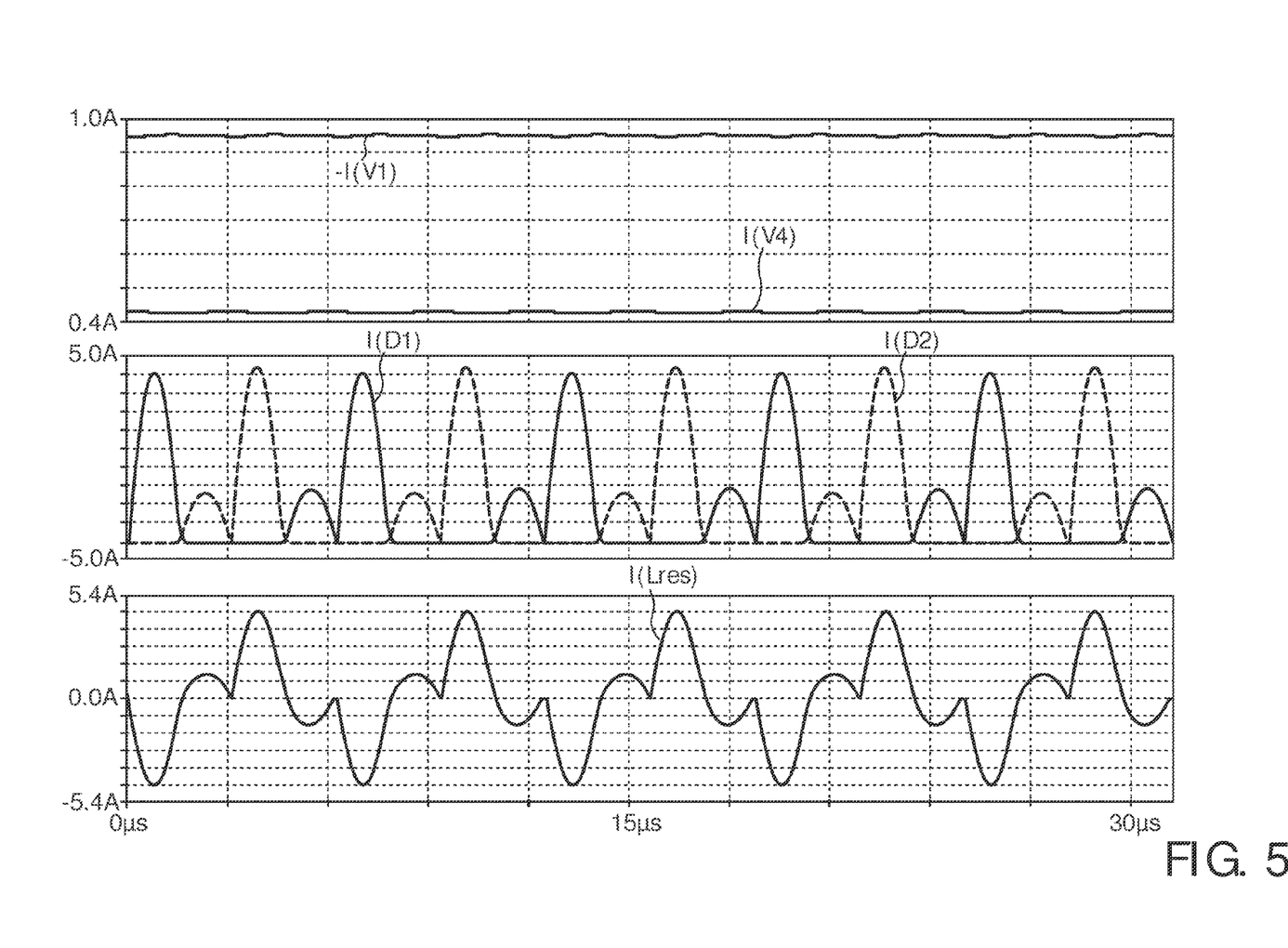
FIG. 5 shows simulation results for a third set of parameter values.

FIG. 5 shows simulation results for a third set of parameter values. In particular, the simulation results are based on an input voltage $V_{in}$=24 V, an output voltage of $V_{out}$=50 V and a switching frequency of the bridge circuit $f_{switch}$=$f_{res}$/2, i.e., the switching frequency is half the resonant frequency $f_{res}$.

Figure 6:
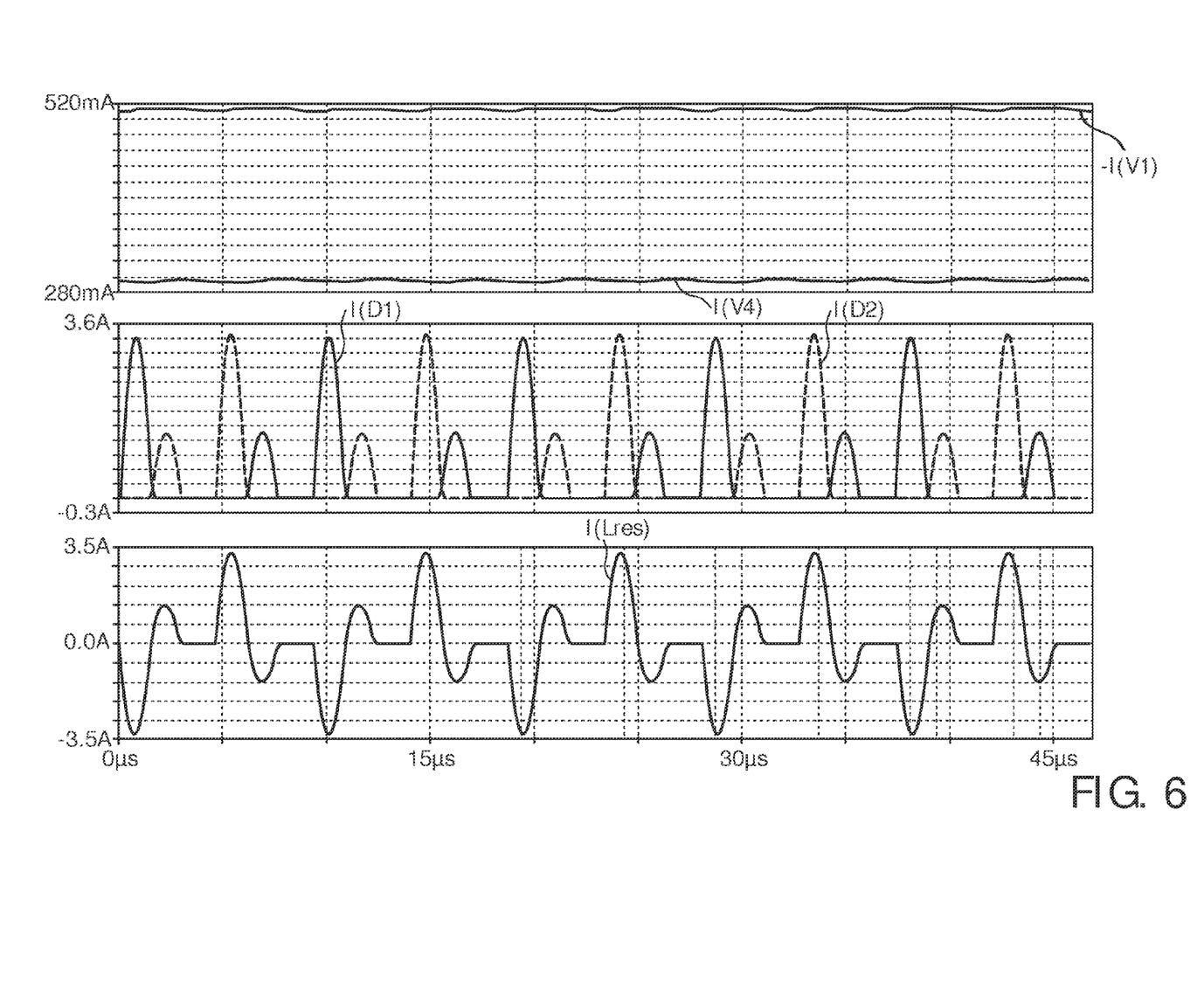
FIG. 6 shows simulation results for a fourth set of parameter values.

FIG. 6 shows simulation results for a fourth set of parameter values. In particular, the simulation results are based on an input voltage $V_{in}$=24 V, an output voltage of $V_{out}$=40 V and a switching frequency of the bridge circuit $f_{switch}$=$f_{res}$/3, i.e., the switching frequency is one third of the resonant frequency $f_{res}$.

Figure 7:
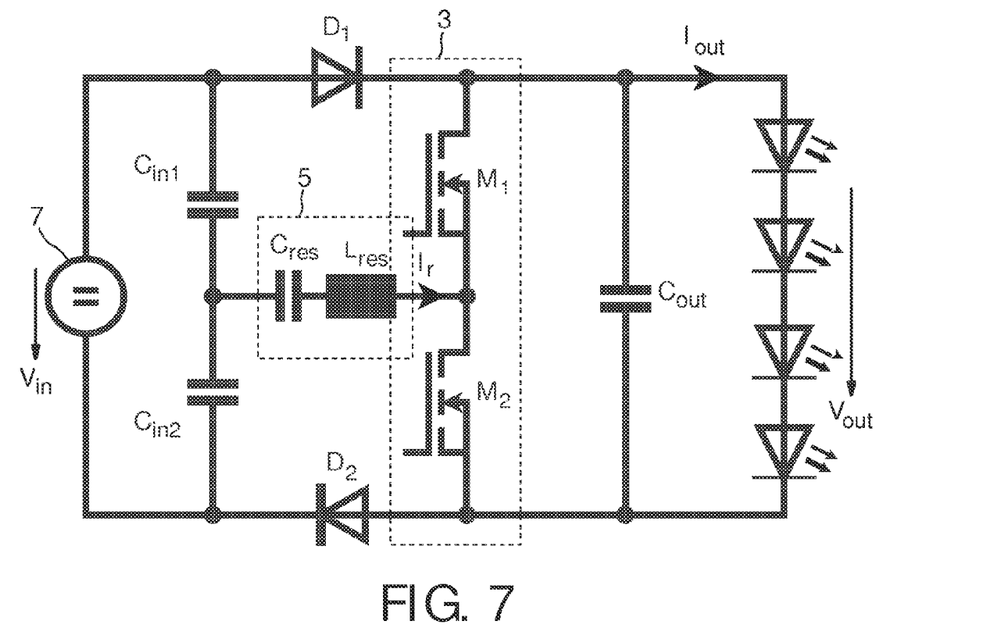
FIG. 7 shows a simplified block diagram of a supply circuit in accordance with an embodiment of the present invention.
Figure 8:
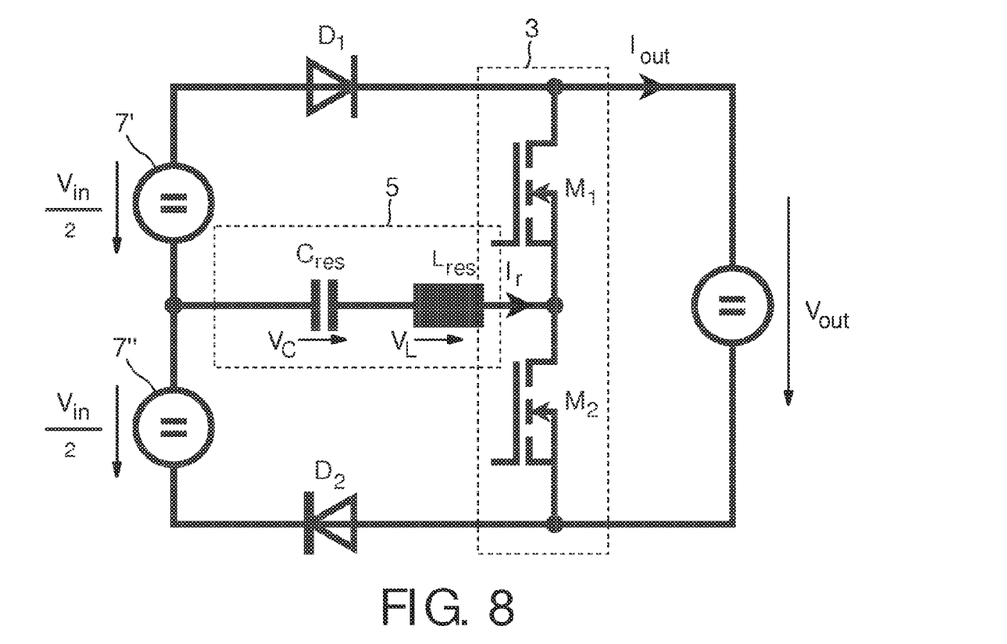
FIG. 8 shows a further simplified block diagram of a supply circuit in accordance with an embodiment of the present invention.

In order to describe the functionality of the supply circuit 1, the topology shown in FIG. 1 can be simplified as illustrated in FIG. 7 and FIG. 8. In FIG. 7, there are two capacitances $C_{in1}$ and $C_{in2}$ provided and additionally a resonant capacitance $C_{res}$. In FIG. 8 the partial resonant capacitances $C_{res}$/2 of FIG. 1 are combined to one single capacitance $C_{res}$ and the power source 7 is virtually split into two partial power sources 7' and 7", each providing a direct voltage $V_{in}$/2. It should be noted that taking two partial capacitances $C_{res}$ or two capacitances $C_{in1}$ and $C_{in2}$ and in addition a resonant capacitance $C_{res}$ leads to the same result. It can be seen from FIG. 8 that a voltage dropped across the capacitance $C_{res}$ is denoted as $V_C$ and a voltage dropped across the inductance $L_{res}$ is denoted as $V_L$.

The resonant circuit 5 can be described with its resonant frequency $f_{res}$ and its resonant impedance $Z_{res}$.

$$f_{res} = \frac{1}{2\pi\sqrt{L_{res} \cdot C_{res}}} \quad (1)$$

$$Z_{res} = \sqrt{\frac{L_{res}}{C_{res}}} \quad (2)$$

Based on simulation results, the circuit behavior can be explained as follows: For the description in time intervals the half resonant period τ is defined.

$$\tau = \frac{1}{2} \cdot T_{res} = \frac{1}{2} \cdot \frac{1}{f_{res}} \quad (3)$$

The switching period of the switches $M_1$ and $M_2$ is $T_{switch}$ as can be seen from FIG. 7 and $2*T_{res} \le T_{switch}$. The conducting parts in each time interval are depicted in FIG. 10 to FIG. 13.

Figure 9:
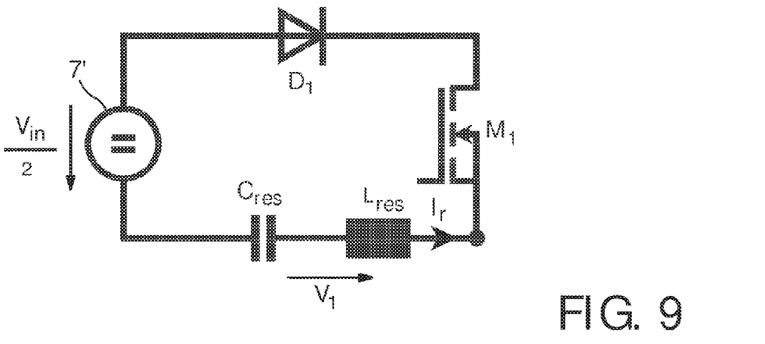
FIG. 9 shows a block diagram of the conducting parts of a supply circuit in accordance with an embodiment of the present invention for a first time interval.
Figure 13:
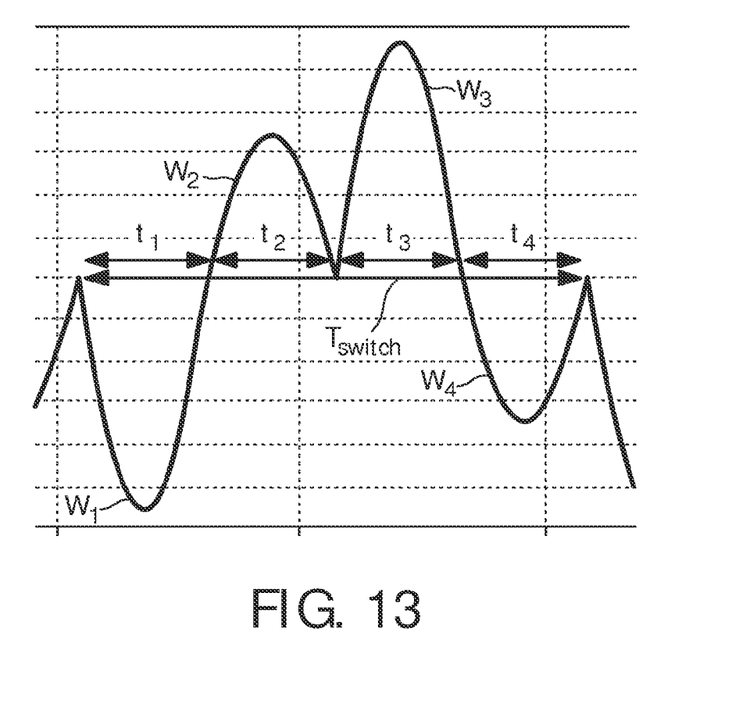
FIG. 13 shows a resonant current signal.

FIG. 9 shows a block diagram of the conducting parts of a supply circuit 1 in accordance with an embodiment of the present invention for a first time interval $t_1$: 0<t≤τ, which is illustrated in FIG. 13. During this time interval, switch $M_1$ is switched on and switch $M_2$ is switched off. The resonant circuit 5 generates in this time interval a first, negative sinusoidal half-wave exemplary denoted in FIG. 13 with $W_1$.

Hence, switch $M_1$ allows a current flow, which is communicated from the direct voltage source 7'. The voltage dropped across the series resonant circuit 3, i.e., across capacitance $C_{res}$ and inductance $L_{res}$ is denoted in FIG. 9 with $V_1$.

As the resulting current $I_r$ is negative, the diode $D_1$ will be conductive for this current. Diode $D_2$ is polarized opposed to diode $D_1$ and will therefore not allow a flow of the negative current $I_r$ in the first time interval.

Based on simulation results, the conducting components in each time interval are known and the amplitude of each sinusoidal half wave can be calculated. From the idealized circuit the voltage dropped across the resonant capacitor, denoted in FIG. 8 as $V_C(t)$, at the beginning of the first time interval can be calculated. The result is:

$$V_C(t=0) = V_{out} - V_t \quad (4)$$

Additionally, the voltage drop $V_1$ across $C_{res}$ and $L_{res}$ can be obtained from FIG. 9: With help of the initial condition and the voltage of the resonant capacitor $V_C$, the amplitude of each sinusoidal half-wave and the capacitor's voltage $V_C$ after finishing each cycle can be calculated. For every cycle the voltage $V_1$, applied to the whole resonant circuit can be obtained from the conducting parts. For the first cycle $V_1$ is:

$$V_1(0 < t \le \tau) = -\frac{V_{in}}{2} \quad (5)$$

Based on idealized circuit behavior, the amplitude of the resulting first, negative sinusoidal half-wave $W_1$ can be calculated.

$$\hat{i}_1 = \frac{-V_{out} + \frac{V_{in}}{2}}{Z_{res}} \quad (6)$$

Further current flow through $D_1$ after this half-wave is prevented by diode $D_1$, as current $I_r$ becomes positive.

Figure 10:
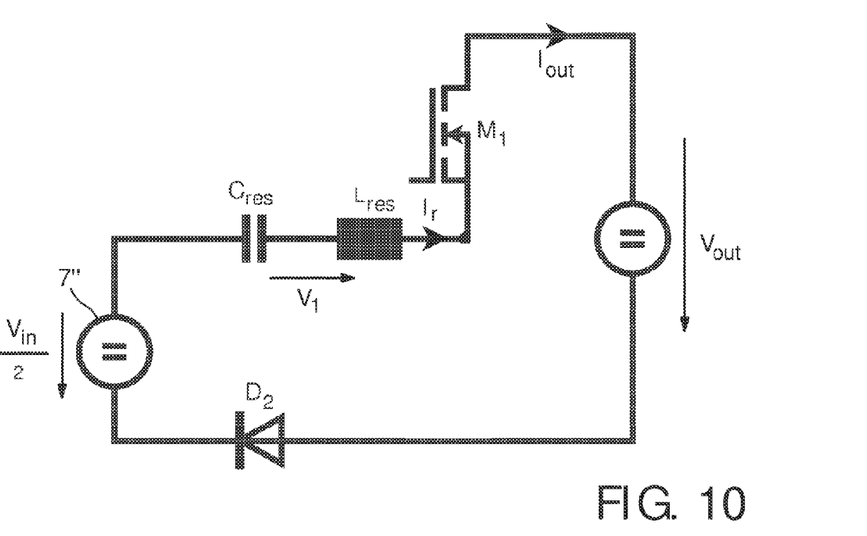
FIG. 10 shows a block diagram of the conducting parts of a supply circuit in accordance with an embodiment of the present invention for a second time interval.

FIG. 10 shows a block diagram of the conducting parts of a supply circuit 1 in accordance with an embodiment of the present invention for a second time interval $t_2$: τ<t≤$T_{switch}$/2. During this time interval, switch $M_1$ is still switched on and switch $M_2$ is still switched off. The resonant circuit 5 generates in this time interval a second, positive sinusoidal half-wave exemplary denoted in FIG. 13 with $W_2$.

Hence, the current $I_r$ is thus positive during this time interval $t_2$. Consequently, diode $D_1$ does not allow current flow and thus blocks the positive current $I_r$. However, diode $D_2$, which is polarized opposed to diode $D_1$ allows current flow of the positive current $I_r$. It is obvious from FIG. 10 that the current $I_{out}$ flows through the output.

From calculations with formulas of the first time interval $t_1$, the resonant capacitors voltage $V_C(t)$ is:

$$V_C(t=\tau) = -V_{out} \quad (7)$$

And $V_1$:

$$V_1(\tau < t \le 2\tau) = \frac{V_{in}}{2} - V_{out} \quad (8)$$

This leads to the amplitude of the second, positive sinusoidal half-wave $W_2$:

$$\hat{I}_2 = \frac{\frac{V_{in}}{2}}{Z_{res}} \quad (9)$$

Further current flow is prevented by diode $D_2$.

Figure 11:
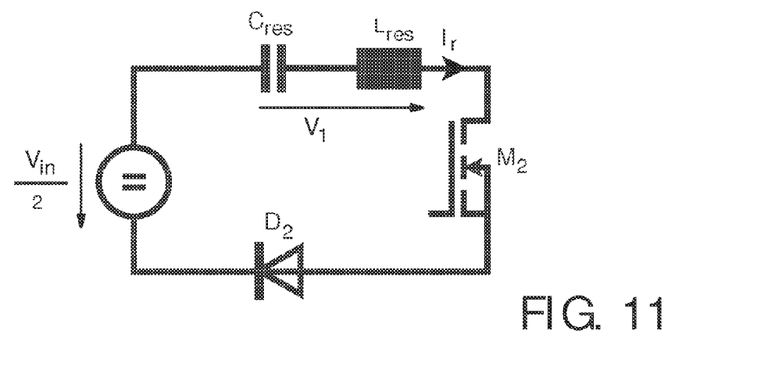
FIG. 11 shows a block diagram of the conducting parts of a supply circuit in accordance with an embodiment of the present invention for a third time interval.

FIG. 11 shows a block diagram of the conducting parts of the supply circuit 1 in accordance with an embodiment of the present invention for a third time interval $t_3$: $T_{switch}/2 < t \leq T_{switch}/2 + \tau$. During this time interval, switch $M_1$ is switched off and switch $M_2$ is switched on. The resonant circuit 5 generates in this time interval a third, positive sinusoidal half-wave exemplary denoted in FIG. 13 with $W_3$.

Hence, the current Ir is thus positive during this time interval $t_3$. Consequently, diode $D_1$ does not allow current flow and thus blocks the positive current $I_r$. However, diode $D_2$, which is polarized opposed to diode $D_1$ allows current flow of the positive current $I_r$.

The behavior in the third and fourth time interval $t_3$ and $t_4$ is similar to that of the first one and second time interval $t_1$ and $t_2$. Basically, the current half-waves occur with the opposite sign.

The capacitor voltage $V_C(t)$ at the beginning of the third time period $t_3$ is:

$$V_C(t = T_{switch}/2) = V_{in} - V_{out} \quad (10)$$

And $V_1$:

$$V_1 \left( \frac{T_{switch}}{2} < t \leq \frac{T_{switch}}{2} + \tau \right) = \frac{V_{in}}{2} \quad (11)$$

Consequently, the third, positive sinusoidal half-wave $W_3$ has the following amplitude:

$$\hat{I}_3 = \frac{V_{out} - \frac{V_{in}}{2}}{Z_{res}} \quad (12)$$

Figure 12:
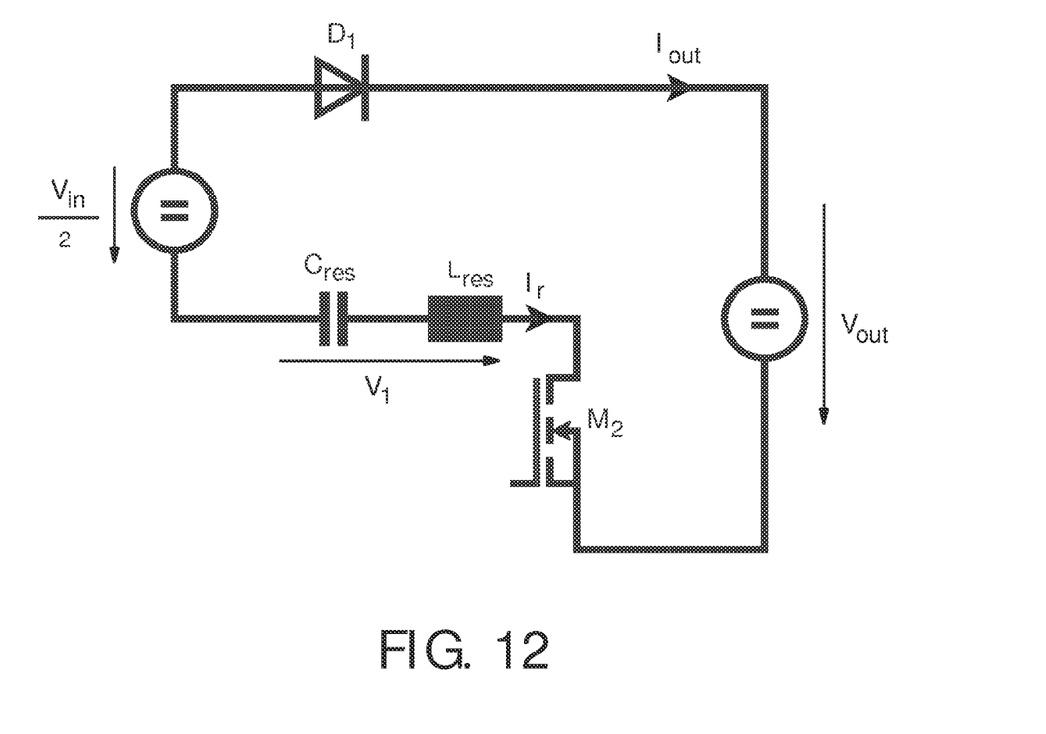
FIG. 12 shows a block diagram of the conducting parts of a supply circuit in accordance with an embodiment of the present invention for a fourth time interval.

FIG. 12 shows a block diagram of the conducting parts of a supply circuit in accordance with an embodiment of the present invention for a fourth time interval $t_4$: $T_{switch}/2 + \tau < t \leq T_{switch}$. During this time interval, switch $M_1$ is still switched off and switch $M_2$ is still switched on. The resonant circuit 5 generates in this time interval a fourth, negative sinusoidal half-wave exemplary denoted in FIG. 13 with $W_4$.

Hence, the current $I_r$ is thus negative during this time interval $t_4$. Consequently, diode D1 does allow current flow of the negative current $I_r$. However, diode $D_2$, which is polarized opposed to diode $D_1$ does not allow current flow of the negative current $I_r$. It is obvious from FIG. 12 that the current $I_{res}$ again flows through the output.

Finally, the capacitor voltage $V_C(t)$ at the beginning of the fourth time period $t_4$ is:

$$V_C(t = T_{switch}/2 + \tau) = V_{out} \quad (13)$$

And $V_1$:

$$V_1 \left( \frac{T_{switch}}{2} < t \leq \frac{T_{switch}}{2} + 2\tau \right) = -\frac{V_{in}}{2} + V_{out} \quad (14)$$

This leads to the amplitude of the fourth, negative, sinusoidal half-wave $W_4$:

$$\hat{I}_4 = -\frac{\frac{V_{in}}{2}}{Z_{res}} \quad (15)$$

The circuit behavior shows, that only two sinusoidal half-waves, namely $W_2$ and $W_4$ flow through the output. Consequently, the output current $I_{out}$ consists of two sinusoidal half-waves $W_2$ and $W_4$ per switching period $T_{switch}$.

Hence, the average output current can be calculated to:

$$\overline{I}_{out} = \frac{\frac{V_{in}}{2}}{\pi \cdot Z_{res}} \cdot \frac{2 T_{res}}{T_{switch}} = \frac{V_{in} \cdot T_{res}}{\pi \cdot Z_{res} \cdot T_{switch}} \quad (16)$$

The functionality of the supply circuit 1 according to the invention and the resulting "boost" function will now be explained in more detail: The topology of the supply circuit 1 causes two of four half-waves (in particular every second of four half-waves) of the resonant current $I_{res}$ not to flow through the output, i.e., the load. With respect to FIGS. 9 to 13, the first and the third half-waves $W_1$ and $W_3$ do not flow through the output as can be seen from FIGS. 9 and 11.

This respective half-wave is e.g., $I_1 = (-V_{out} + V_{in}/2) Z_{res}$, when referring to the first have wave $W_1$ of FIG. 13. Taking into account the initial condition for the voltage drop across the capacitance $C_{res}$ and the voltage drop $V_1$ across the resonant circuit 5, the amount of the voltage drop across the capacitance $C_{res}$ after the first half-wave $W_1$ is equal to the output voltage $V_{out}$. Hence, for the subsequent half-wave $W_2$, the available voltage is resulting from the series connection of the voltage drop corresponding to $V_{out}$ across the capacitance $C_{res}$ and half of the input voltage $V_{in}/2$.

However, the output voltage $V_{out}$ always acts against the second half-wave $W_2$, and thus, the half of the input voltage, namely $V_{in}/2$ is always left over, enforcing a current flow through the load. Consequently, the second and fourth half-waves $W_2$ and $W_4$ flow through the load and the amplitude of the current is independent from the load voltage in case that the load voltage is larger than the input voltage $V_{in}$.

Consequently, the present invention provides a supply circuit 1, in particular a converter topology that can be used for automotive LED/OLED lighting or in general, for battery powered LED/OLED lighting as it not only constitutes a DSRC-I, which is preferably used for the above-named applications, but due to the inventive topology, the supply circuit 1 in addition provides a boost function providing a higher output voltage $V_{out}$ than the input voltage $V_{in}$ without the need for additional components. Above all, dimming of LEDs/OLEDs can be realized by decreasing the switching frequency $f_{switch}$. Waveforms with decreased switching frequency are shown in FIG. 6.

In a further embodiment, a control loop, i.e. a feedback loop, can be additionally provided. The feedback loop would, for example, measure the LED current or voltage, send this signal to the controller and adjust the control signals of the electronic switches accordingly.

In summary, the novel topology of the supply circuit according to the present invention offers basically the same major advantages as the conventional DSRC-I converter, but additionally it provides a higher output voltage $V_{out}$ than the input voltage $V_{in}$.

Although the novel supply circuit may be considered to be disadvantageous because of the conductive part over the two diodes $D_1$ and $D_2$ for an output voltage $V_{out}$ lower than the input voltage $V_{in}$, in reality this will cause no problems, as the forward threshold voltage of the connected load in particular LEDs result in a high output voltage $V_{out}$. This blocks current flow if the converter is not controlled.

Altogether, the converter provides the advantage that no current sensing and current control is required, furthermore, a very compact circuit design is provided with an integrated voltage boost. The supply circuit according to the present invention is above all easy to design, simple to control and provides a high efficiency. It shall be understood that the same advantages are valid for a device according to the invention, comprising the supply circuit.

While the invention has been illustrated and described in detail in the drawings and foregoing description, such illustration and description are to be considered illustrative or exemplary and not restrictive; the invention is not limited to the disclosed embodiment. Other variations to the disclosed embodiment can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measured cannot be used to advantage.

Any reference signs in the claims should not be construed as limiting the scope.

The invention claimed is:

1. A supply circuit comprising:
   a bridge circuit comprising a first switch and a second switch, wherein each of the first and second switches has at least a first terminal and a second terminal, and wherein said first switch and said second switch are connected in series by a connection of said second terminal of said first switch with said first terminal of said second switch, and forming an interconnection therebetween, and wherein said bridge circuit is coupled to a load circuit;
   a resonant circuit, having a resonant capacitance and a resonant frequency, coupled at one end to a power source and coupled at another end to the interconnection of the first and second switches of the bridge circuit, wherein the resonant circuit is a series resonant circuit comprising an inductance and the resonant capacitance, wherein the resonant capacitance is divided into a first partial capacitance and a second partial capacitance, the first and second partial capacitances each comprising half of the resonant capacitance,
   wherein the first partial capacitance comprises a first capacitor and a second capacitor coupled to an interconnection between a first diode and the power source, and
   wherein the second partial capacitance comprises the first capacitor and a third capacitor coupled to an interconnection between a second diode and the power source;
   the first diode being coupled in series with the first switch at the first terminal of the first switch, with reference to the power source, and forming the interconnection between the first diode and said power source;
   the second diode being coupled in series with the second switch at the second terminal of the second switch, with reference to the power source, and forming the interconnection between the second diode and said power source; and
   a control unit configured or programmed to:
   move said first switch to an on position and move said second switch to an off position during a first time interval and a second time interval, wherein said resonant circuit is configured to generate a first, negative sinusoidal half wave during said first time interval and to generate a second, positive sinusoidal half wave during said second time interval;
   move said first switch to an off position and move said second switch to an on position during a third time interval and a fourth time interval, wherein said resonant circuit is configured to generate a third, positive sinusoidal half wave during said third time interval and to generate a fourth, negative sinusoidal half wave during said fourth time interval; and
   provide a maximum switching frequency of the bridge circuit, wherein the maximum switching frequency of the bridge circuit is in a range from 10% to 50% of the resonant frequency of the resonant circuit, whereby resonant current is caused to flow through the load circuit during the second and fourth time intervals, and whereby resonant current does not flow through the load circuit during the first and third time intervals.

2. The supply circuit as defined in claim 1, wherein said first diode is polarized with respect to said first switch so that a flow of negative resonant current is allowed and said second diode is polarized with respect to said second switch so that a flow of positive resonant current is allowed.

3. The supply circuit as defined in claim 1, wherein the resonant circuit is coupled to the interconnection between the first diode and the power source, and to the interconnection between the second diode and the power source.

4. The supply circuit as defined in claim 1, wherein said first switch and said second switch are MOSFETs.

5. The supply circuit as defined in claim 1, wherein said maximum is equal to half the resonant frequency of the resonant circuit.

6. The supply circuit as defined in claim 5, wherein the control unit is adapted for providing a switching of the first and second switches of the bridge circuit with a duty-cycle of up to 50%.

7. A device comprising: a power supply, a load circuit, and a supply circuit, wherein said supply circuit comprises:
   a bridge circuit comprising a first switch and a second switch, each of the first and second switches having a first and second terminal, wherein said first switch and said second switch are connected in series by a connection of said second terminal of said first switch with said first terminal of said second switch, forming an interconnection therebetween, and wherein said bridge circuit is coupled to said load circuit;
   a resonant circuit, having a resonant capacitance and a resonant frequency, coupled at one end to a power source and coupled at another end to the interconnection of the first and second switches of the bridge circuit, wherein the resonant circuit is a series resonant circuit comprising an inductance and the resonant capacitance, wherein the resonant capacitance is divided into a first partial capacitance and a second partial capacitance, the first and second partial capacitances each comprising half of the resonant capacitance,
   wherein the first partial capacitance comprises a first capacitor and a second capacitor coupled to an interconnection between a first diode and the power source, and
   wherein the second partial capacitance comprises the first capacitor and a third capacitor coupled to an interconnection between a second diode and the power source;

the first diode being coupled in series with the first switch at the first terminal of the first switch, with reference to the power source, forming the interconnection between the first diode and said power source;

the second diode being coupled in series with the second switch at the second terminal of the second switch, with reference to the power source, forming the interconnection between the second diode and said power source; and a control unit configured or programmed to:
  move said first switch to an on position and move said second switch to an off position during a first time interval and a second time interval, wherein said resonant circuit is configured to generate a first, negative sinusoidal half wave during said first time interval and to generate a second, positive sinusoidal half wave during said second time interval;
  move said first switch to an off position and move said second switch to an on position during a third time interval and a fourth time interval, wherein said resonant circuit is configured to generate a third, positive sinusoidal half wave during said third time interval and to generate a fourth, negative sinusoidal half wave during said fourth time interval; and
  provide a maximum switching frequency of the bridge circuit, wherein the maximum switching frequency of the bridge circuit is in a range from 10% to 50% of the resonant frequency of the resonant circuit, whereby resonant current is caused to flow through the load circuit during the second and fourth time intervals, and whereby resonant current does not flow through the load circuit during the first and third time intervals.

8. The device as claimed in claim 7, further comprising an output filter between said supply circuit and said load circuit.

9. The device as defined in claim 7, wherein said first diode is polarized with respect to said first switch so that a flow of negative resonant current is allowed and said second diode is polarized with respect to said second switch so that a flow of positive resonant current is allowed.

10. The device as defined in claim 7, wherein the resonant circuit is coupled to the interconnection between the first diode and the power source, and to the interconnection between the second diode and the power source.

11. The device as defined in claim 7, wherein said first switch and said second switch are MOSFETs.

12. The device as defined in claim 7, wherein said maximum is equal to half the resonant frequency of the resonant circuit.

13. The device as defined in claim 12, wherein the control unit is adapted for providing a switching of the first and second switches of the bridge circuit with a duty-cycle of up to 50%.

14. A supply circuit comprising: a bridge circuit comprising a first switch and a second switch, wherein each of the first and second switches has at least a first terminal and a second terminal, and wherein said first switch and said second switch are connected in series, and forming an interconnection therebetween, and wherein said bridge circuit is coupled to a load circuit;
  a resonant circuit, having a resonant capacitance and a resonant frequency, coupled at one end to a power source and coupled at another end to the interconnection of the first and second switches of the bridge circuit, wherein the resonant circuit is a series resonant circuit comprising an inductance and the resonant capacitance, wherein the resonant capacitance is divided into a first partial capacitance and a second partial capacitance, the first and second partial capacitances each comprising half of the resonant capacitance,
  wherein the first partial capacitance comprises a first capacitor and a second capacitor coupled to an interconnection between a first diode and the power source, and
  wherein the second partial capacitance comprises the first capacitor and a third capacitor coupled to an interconnection between a second diode and the power source;
  the first diode being coupled in series with the first switch, with reference to the power source, and forming the interconnection between the first diode and said power source, such that flow of current to said load is limited to a single predetermined direction;
  the second diode being coupled in series with the second switch, with reference to the power source, and forming the interconnection between the second diode and said power source such that flow of current to said load is limited to said predetermined direction; and
  a control unit configured or programmed to:
    move said first switch to an on position and move said second switch to an off position during a first time interval and a second time interval, wherein said resonant circuit is configured to generate a first, negative sinusoidal half wave during said first time interval and to generate a second, positive sinusoidal half wave during said second time interval;
    move said first switch to an off position and move said second switch to an on position during a third time interval and a fourth time interval, wherein said resonant circuit is configured to generate a third, positive sinusoidal half wave during said third time interval and to generate a fourth, negative sinusoidal half wave during said fourth time interval; and
    provide a maximum switching frequency of the bridge circuit, wherein the maximum switching frequency of the bridge circuit is in a range from 10% to 50% of the resonant frequency of the resonant circuit, whereby resonant current is caused to flow through the load circuit during the second and fourth time intervals, and whereby resonant current does not flow through the load circuit during the first and third time intervals.

15. A device comprising: a power supply, a load circuit, and a supply circuit, wherein said supply circuit comprises a bridge circuit comprising a first switch and a second switch, each of the first and second switches having a first and second terminal, wherein said first switch and said second switch are connected in series, forming an interconnection therebetween, and wherein said bridge circuit is coupled to said load circuit;
  a resonant circuit, having a resonant capacitance and a resonant frequency, coupled at one end to a power source and coupled at another end to the interconnection of the first and second switches of the bridge circuit, wherein the resonant circuit is a series resonant circuit comprising an inductance and the resonant capacitance, wherein the resonant capacitance is divided into a first partial capacitance and a second partial capacitance, the first and second partial capacitances each comprising half of the resonant capacitance,
  wherein the first partial capacitance comprises a first capacitor and a second capacitor coupled to an interconnection between a first diode and the power source, and
  wherein the second partial capacitance comprises the first capacitor and a third capacitor coupled to an interconnection between a second diode and the power source;

the first diode being coupled in series with the first switch, with reference to the power source, forming the interconnection between the first diode and said power source, such that flow of current to said load is limited to a single predetermined direction;

the second diode being coupled in series with the second switch, with reference to the power source, forming the interconnection between the second diode and said power source, such that flow of current to said load is limited to said predetermined direction; and a control unit configured or programmed to:

move said first switch to an on position and move said second switch to an off position during a first time interval and a second time interval, wherein said resonant circuit is configured to generate a first, negative sinusoidal half wave during said first time interval and to generate a second, positive sinusoidal half wave during said second time interval;

move said first switch to an off position and move said second switch to an on position during a third time interval and a fourth time interval, wherein said resonant circuit is configured to generate a third, positive sinusoidal half wave during said third time interval and to generate a fourth, negative sinusoidal half wave during said fourth time interval; and provide a maximum switching frequency of the bridge circuit, wherein the maximum switching frequency of the bridge circuit is in a range from 10% to 50% of the resonant frequency of the resonant circuit, whereby resonant current is caused to flow through the load circuit during the second and fourth time intervals, and whereby resonant current does not flow through the load circuit during the first and third time intervals.

* * * * *